United States Patent
Enander et al.

(10) Patent No.: US 6,273,033 B1
(45) Date of Patent: Aug. 14, 2001

(54) INTERNAL COMBUSTION ENGINE INSTALLATION IN A MOTOR VEHICLE

(75) Inventors: Niklas Enander, Gothenburg; Arne Andersson, Molnlycke, both of (SE)

(73) Assignee: AB Volvo, Gothenburg (SE)

( * ) Notice: Subject to any disclaimer, the term of this patent is extended or adjusted under 35 U.S.C. 154(b) by 0 days.

(21) Appl. No.: 09/438,947

(22) Filed: Nov. 12, 1999

(30) Foreign Application Priority Data

Nov. 12, 1998 (SE) .................................................... 9803872

(51) Int. Cl.$^7$ ......................................................... F01P 7/16
(52) U.S. Cl. .................. 123/41.1; 123/41.31; 123/41.08
(58) Field of Search ............................... 123/41.1, 41.31, 123/41.08, 41.09, 568.12

(56) References Cited

U.S. PATENT DOCUMENTS

| | | | |
|---|---|---|---|
| 4,513,695 | * 4/1985 | Patchen, II | ............................ 123/41.1 |
| 5,174,254 | * 12/1992 | Humburg | ....................... 123/142.5 R |
| 5,794,575 | * 8/1998 | Sonnemann et al. | .............. 123/41.08 |
| 5,950,576 | * 9/1999 | Busato et al. | ....................... 123/41.08 |

FOREIGN PATENT DOCUMENTS

| | | |
|---|---|---|
| 3603378 | 8/1986 | (DE) . |
| 8-296437 | 11/1996 | (JP) . |
| 10-921 | 1/1998 | (JP) . |
| WO 96/36505 | 11/1996 | (WO) . |

* cited by examiner

*Primary Examiner*—Tony M. Argenbright
*Assistant Examiner*—Katrina B. Harris
(74) *Attorney, Agent, or Firm*—Young & Thompson

(57) ABSTRACT

An internal combustion engine in a motor vehicle with a coolant system, includes a cab heater (23) and a cooling element (21) for cooling exhaust recirculating to the inlet side of the engine (1). The cooling element has a coolant outlet (26), which communicates with the coolant inlet (22) of the cab heater to quickly heat the cab heater with the aid of the exhaust when the engine is cold-started.

7 Claims, 3 Drawing Sheets

INTERNAL COMBUSTION ENGINE INSTALLATION IN A MOTOR VEHICLE

The present invention relates to an internal combustion engine installation in a motor vehicle with a coolant system, comprising a radiator for cooling engine coolant, a heating element for heating vehicle cab air, a cooling element for cooling exhaust recirculated to the engine inlet side, a circulation pump for circulation of coolant through the system, and a first thermostatic valve for temperature-controlled distribution of coolant from the engine between the radiator and a by-pass past the radiator to the suction side of the pump.

BACKGROUND OF THE INVENTION

It is a known fact that it often takes several minutes from cold starting an engine until its cooling temperature has reached a level where the cab heating element provides any noticeable heating of the cab air. The larger the engine is, i.e. the more metal mass it has, the longer it takes to warm up from cold start. Engine efficiency also plays a roll in this context, meaning that a diesel engine generally takes longer to warm up than a gasoline engine. In the large truck diesels weighing up to about one ton, it will take up to ten minutes to achieve any noticeable warming of the air, so that, for example, the defroster system of the vehicle will begin to have any effect.

A known solution for achieving more rapid heating of the cab air and the engine coolant is to install an engine fuel-burning heater in the engine coolant system or the cab air system. Such units are available both for gasoline operation and diesel operation and are quite expensive.

SUMMARY OF THE INVENTION

The purpose of the present invention is to achieve an internal combustion engine installation of the way described by way of introduction, which makes it possible, in a significantly shorter time than what has been hitherto possible, to achieve, without a fuel burning heater unit, an appreciable heating of the cab air in the vehicle.

This is achieved according to the invention by virtue of the fact that the cooling element has a coolant outlet, which communicates with the coolant inlet of the heater element.

In a preferred embodiment, the coolant system has a second thermostatic valve, which is arranged on the outlet side of the cooling element and regulates the water temperature in the cooling element. When there is a cold start, the hot exhaust heats the water in the cooling element quite rapidly. The second thermostat can suitably have a command temperature, which is somewhat higher than the command temperature of the first thermostat which controls the engine coolant temperature. It has been shown that at cold start, the heating temperature to a certain air temperature of the air from the heater element could be reduced from ten minutes to one minute by virtue of the described arrangement according to the invention. In addition to the advantage of a substantially shorter warm-up time for the heater element, additional advantages are obtained. Normally exhaust recirculation to the intake side when the coolant temperature is below about 60° C. due to the risk of condensation and subsequent corrosion in the cooling element. By arranging a thermostatic valve, which controls the exit temperature from the cooling element, exhaust recirculation can be used directly from cold start without any risk of condensation, since the coolant in the cooling element rapidly, within a few seconds, reaches temperatures above 60° C. Total engine exhaust emissions are reduced, firstly, by virtue of the fact that exhaust recirculation can be employed right from the start and, secondly, by virtue of the fact that exhaust energy is returned to the engine, which heats the engine more rapidly with a potential for reduced hydrocarbon emissions and reduced fuel consumption.

BRIEF DESCRIPTION OF THE DRAWINGS

The invention will be described in more detail below with reference to examples shown in the accompanying drawings, where.

DETAILED DESCRIPTION OF THE PREFERRED EMBODIMENTS

Figure 1:
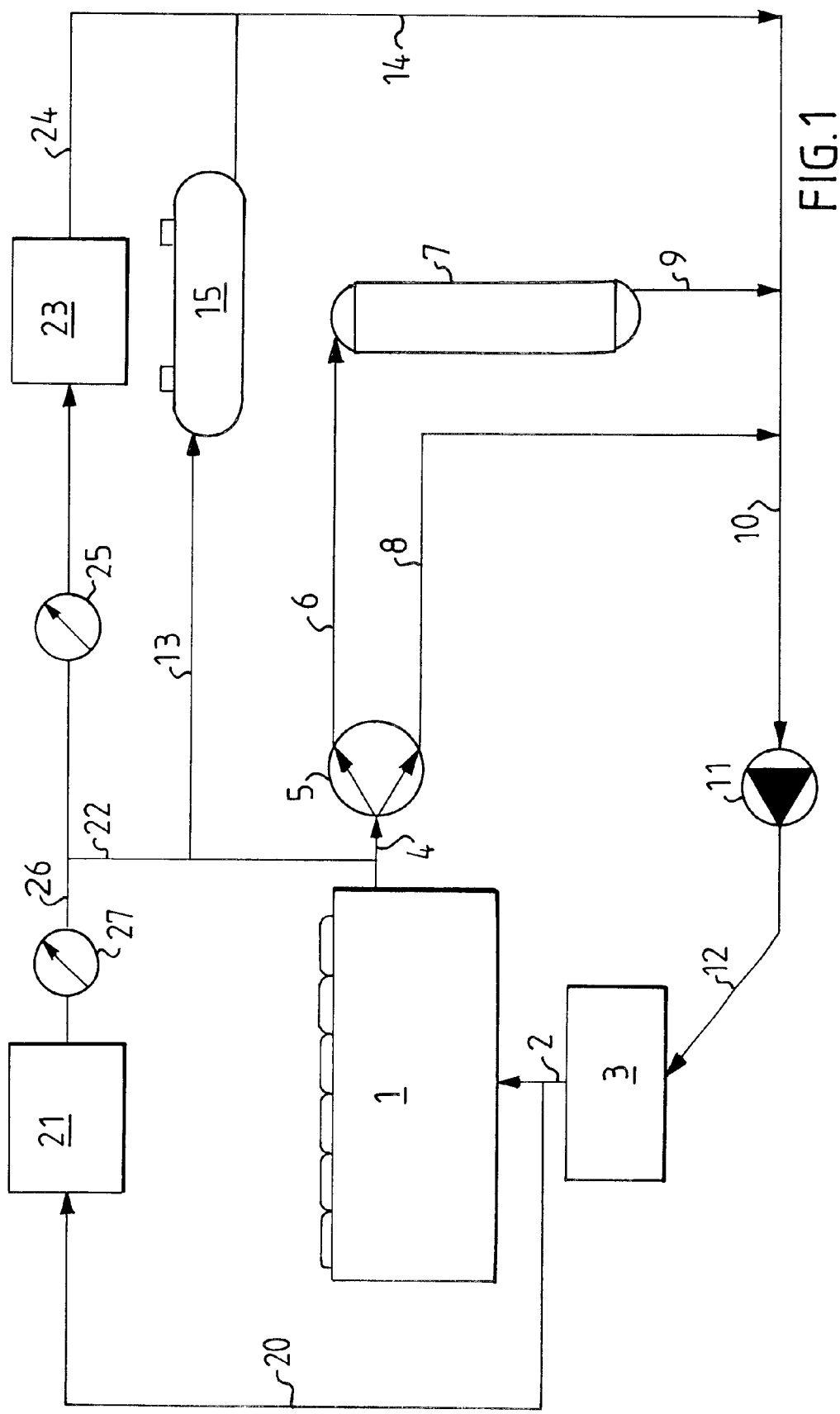
FIG. 1 shows a block diagram of a first embodiment of an engine installation according to the invention.

In FIG. 1, 1 designates a six-cylinder engine with a coolant inlet conduit 2 from an oil cooler 3 and an outlet conduit 4 to a thermostat 5, which distributes the coolant from the engine 1 between a conduit 6 to a radiator 7 and a by-pass 8 which, as does a conduit 9 from the radiator 7, communicates with a suction conduit 10 to a coolant pump 11, the pressure conduit 12 of which opens into the oil cooler 3. Together with a coolant circuit 13, 14 via an expansion tank 15, the coolant system shown and described above is a conventional system.

From the coolant inlet conduit 2 of the engine, there branches off a coolant inlet conduit 20 to a cooling element 21, through which exhaust, recirculated to the engine intake side, passes for exhaust cooling with the engine coolant. The design, function and connection to the exhaust conduit of the cooling element are known and do not need to be shown and described in more detail here.

From the conduit 13 to the expansion tank 15, a conduit 22 branches off to a heater element 23, which is placed in a known manner in or near the vehicle cab. An outlet conduit 24 is connected to the suction conduit 10 of the pump 11 via conduit 14 from the expansion tank 15. In the conduit 22 to the heater element 23 there is coupled in a known manner a control valve 25, by means of which the output of the heater element can be regulated by controlling the coolant flow to the heater element. The valve 25 can be a PWM-valve, known in this context.

Instead of connecting in a known manner the cooling element 21 outlet directly via the engine coolant outlet to the suction side of the coolant pump 11, in accordance with the invention an outlet conduit 26 is connected directly to the inlet conduit 22 of the heater element 23, so that coolant, heated by the recirculated exhaust, is circulated through the heater element 23. The hot exhaust heats the coolant in the cooling element much more rapidly than the engine can heat the coolant in the engine coolant channels, and thus the heater element is supplied with hot coolant in a fraction of the time it takes to reach the same temperature via the engine.

FIG. 1 shows a preferred embodiment of an installation according to the invention, which is particularly, but not exclusively, intended for heavy diesel vehicles, which have, in their existing heater units, a PWM-control valve in the coolant supply conduit 22 to the heater element 23. Here, a thermostatic valve 27 is arranged in the outlet conduit 26 from the cooling element 21. The thermostatic valve 27 regulates the temperature of the coolant flowing out from the cooling element 21, and is suitably set so that the temperature is somewhat higher than the coolant temperature in the engine. A suitable temperature can be about 95° C. From cold start and until the engine has reached working temperature, the valve 25 regulates the flow through it in relation to the thermostatic valve 27, so that the flow through the valves 25, 27 is approximately the same, which means that practically all of the outflow from the cooling element 21 will go to the heater element 23 and that there will be no or practically no added flow from the engine outlet side via the conduit 22.

Figure 2:
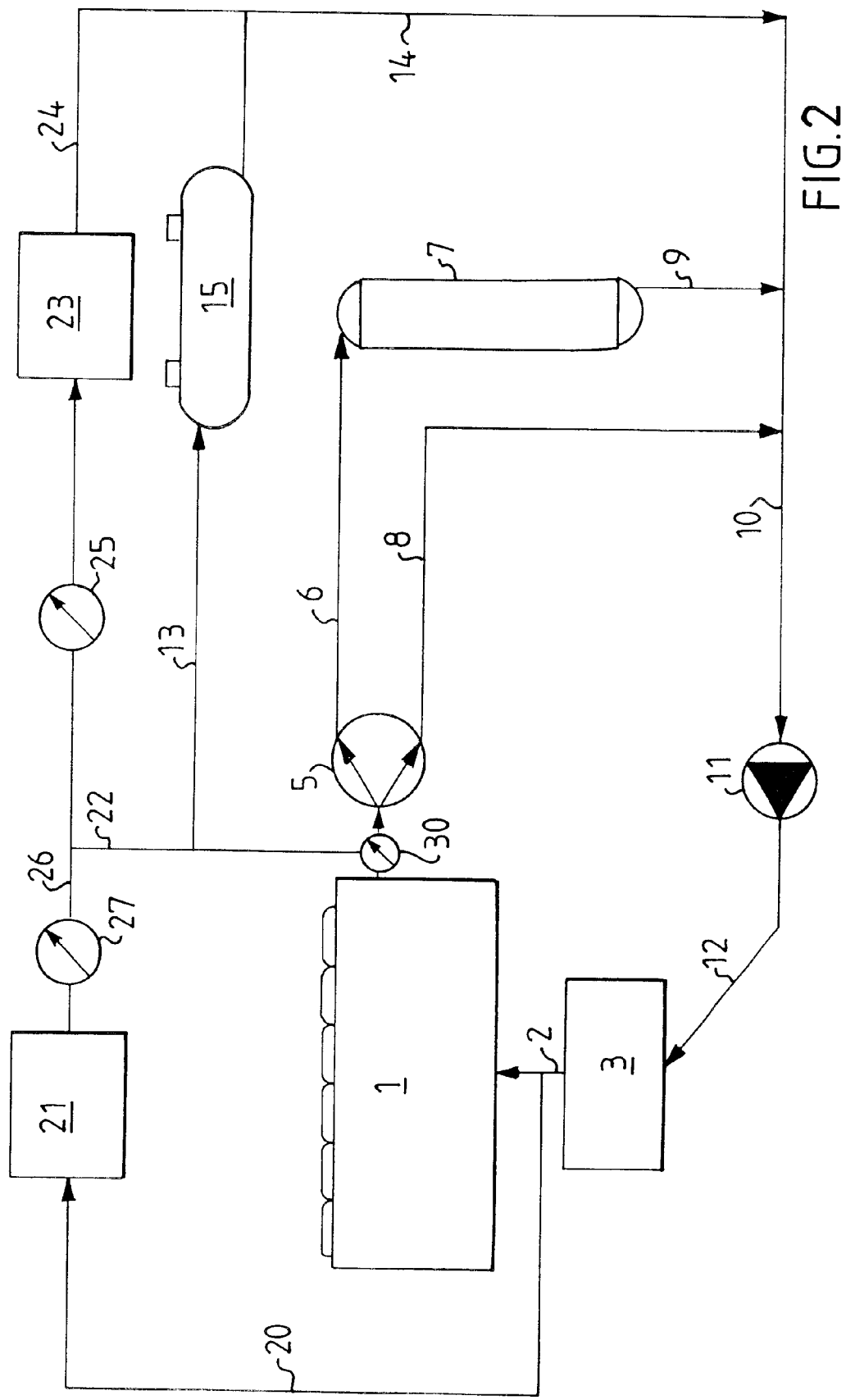
FIG. 2 shows a corresponding block diagram of a second embodiment of an engine installation according to the invention.

FIG. 2 shows an embodiment of an installation according to the invention which differs from that described above in that it lacks, firstly, a valve corresponding to the PWM-valve 25 and, secondly, a thermostatic valve corresponding to the thermostatic valve 27. Instead, a valve 30 is arranged in the engine coolant outlet to the thermostatic valve 5. The installation in FIG. 2 is primarily, but not exclusively, intended for passenger cars, in which the air temperature in the passenger compartment is controlled by mixing cold air and heated air, in contrast to the preceding example, where the air temperature was controlled by the coolant temperature. In passenger car heaters, there is in general a valve (not shown), which closes off the coolant flow entirely when no heating is desired. When cold-starting, the valve 30 is kept closed or essentially closed. The valve 30 can be controlled by the coolant temperature of the engine and, in this case, a minimal flow is required for the control function, but the valve 30 can also be controlled by other control parameters, and it can be, in this case, kept completely closed during a short period after engine start. With the valve 30 completely or practically completely closed at cold-starting, only a small amount of the total coolant in the system will circulate through the cooling element 21 and the heating element 23. In an engine installation with a total coolant amount of about 5 liters, we are dealing here with about 1 liter. In addition to a very rapid heating of the heating element 23, there is also achieved a more rapid heating of the walls of the combustion chamber, since no coolant is circulating through the engine when the valve 30 is closed. The pump only needs to circulate a fraction of the total amount of coolant, in the example shown only a fifth of the total amount of coolant. The pump power is reduced, which saves fuel. In a passenger car installation, the time from cold start to a noticeable warming of the air was reduced from about three minutes to less than 30 seconds. In a passenger car it is not always necessary to have an oil-cooler 3, but if it is required, it can be placed as shown in FIG. 2.

Figure 3:
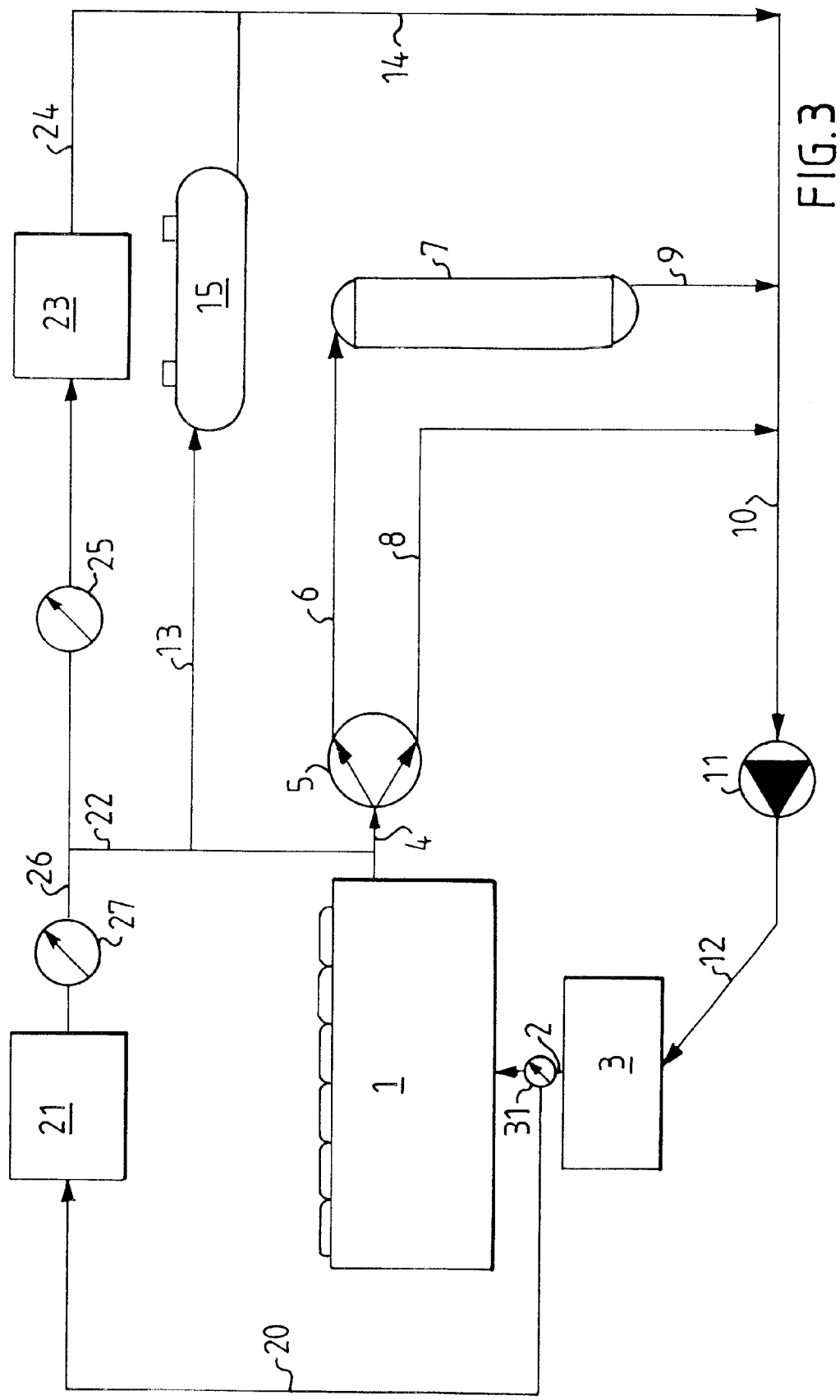
FIG. 3 shows a block diagram of a third embodiment of an engine installation according to the invention.

In order to prevent coolant circulation through the engine at cold-start, as an alternative to the valve 30, a valve 31 can be arranged as shown in FIG. 3 in the coolant inlet to the engine.

What is claimed is:

1. Internal combustion engine installation in a motor vehicle with a coolant system, comprising a radiator for cooling engine coolant, a heating element for heating vehicle cab air, a cooling element for cooling exhaust recirculated to the engine inlet side, a circulation pump for circulation of coolant through the system, and a first thermostatic valve for temperature-controlled distribution of coolant from the engine between the radiator and a by-pass past the radiator to the suction side of the pump, wherein the cooling element (21) has a coolant outlet, which communicates with a coolant inlet to the heating element (23).

2. Installation according to claim 1, wherein a first conduit (26) connects the coolant outlet of the cooling element (21) to a coolant inlet conduit (22) to the heater element (23), said inlet conduit (22) communicating with the engine coolant outlet at a point before the thermostatic valve (5).

3. Installation according to claim 1, wherein the coolant system has a second thermostatic valve (27) which is arranged on the outlet side of the cooling element (21) and regulates the coolant temperature in the cooling element.

4. Installation according to claim 3, wherein a control valve (25) is arranged in the inlet conduit to the heater element (23), said control valve (25) being disposed, when the engine is cold-started, to regulate the inflow to the heater element to be at least essentially equal to the outflow from the cooling element (21).

5. Installation according to claim 1, wherein the coolant system has a valve (30) controlled as a function of engine temperature, said valve (30) being disposed, at low engine temperature, to at least limit coolant flow through the engine (1).

6. Installation according to claim 5, wherein the valve controlled as a function of engine temperature, is arranged on the inlet side for engine coolant after a coolant branch-off (20) to the inlet of the cooling element (21).

7. Installation according to claim 5, wherein the valve (30) controlled as a function of engine temperature, is arranged on the outlet side for engine coolant prior to the first thermostatic valve (5).

* * * * *